(12) United States Patent
Chen

(10) Patent No.: US 12,413,107 B2
(45) Date of Patent: Sep. 9, 2025

(54) MAGNETIC POWER ELECTRICITY GENERATING SYSTEM

(71) Applicant: Feng-Tien Chen, Taichung (TW)

(72) Inventor: Feng-Tien Chen, Taichung (TW)

( * ) Notice: Subject to any disclaimer, the term of this patent is extended or adjusted under 35 U.S.C. 154(b) by 402 days.

(21) Appl. No.: 18/097,733

(22) Filed: Jan. 17, 2023

(65) Prior Publication Data
US 2023/0268784 A1 Aug. 24, 2023

(30) Foreign Application Priority Data

Feb. 24, 2022 (TW) .................................. 111106757
Dec. 30, 2022 (TW) .................................. 111150902

(51) Int. Cl.
| | | |
|---|---|---|
| *H02K 1/16* | (2006.01) | |
| *H02K 3/12* | (2006.01) | |
| *H02K 5/04* | (2006.01) | |
| *H02K 7/02* | (2006.01) | |
| *H02K 9/19* | (2006.01) | |

(52) U.S. Cl.
CPC ............... *H02K 1/16* (2013.01); *H02K 3/12* (2013.01); *H02K 5/04* (2013.01); *H02K 7/02* (2013.01); *H02K 9/19* (2013.01)

(58) Field of Classification Search
CPC .. H02K 1/16; H02K 3/12; H02K 5/04; H02K 7/02; H02K 9/19
USPC .................................................. 310/216.001
See application file for complete search history.

(56) References Cited

U.S. PATENT DOCUMENTS

| | | | |
|---|---|---|---|
| 4,417,192 A | 11/1983 | Ghosh | |
| 10,122,240 B2 | 11/2018 | Tsai | |
| 11,065,979 B1 | 7/2021 | Demont et al. | |
| 11,626,779 B2 * | 4/2023 | Shaw ........................ | H02K 7/14 310/68 R |
| 11,757,316 B2 * | 9/2023 | Michaelides .......... | H02K 21/16 310/156.01 |
| 2011/0089775 A1* | 4/2011 | Flynn ....................... | H02K 1/17 310/46 |
| 2012/0091836 A1* | 4/2012 | Hayashi .............. | F16H 57/0412 165/185 |

(Continued)

FOREIGN PATENT DOCUMENTS

EP 3 644 492 A1 4/2020

*Primary Examiner* — Rashad H Johnson
(74) *Attorney, Agent, or Firm* — Birch, Stewart, Kolasch & Birch, LLP

(57) ABSTRACT

A magnetic power electricity generating system comprises an electrical machine unit and a control unit. The electrical machine unit comprises a first electrical machine with a first operating mode and a second operating mode. The first operating mode is that the first electrical machine is operated in a motor operating mode and the second operating mode is that the first electrical machine is operated in a motor operating mode and a generator operating mode simultaneously. The control unit is electrically connected respectively to the electrical machine unit and an external power supply for controlling the first electrical machine to be operated in the first operation mode or in the second operation mode. The magnetic power electricity generating system may further comprise a first flywheel coupled with the first electrical machine to enable the first electrical machine to supply electrical energy to external loadings.

7 Claims, 13 Drawing Sheets

(56) References Cited

U.S. PATENT DOCUMENTS

| | | | |
|---|---|---|---|
| 2013/0241366 A1* | 9/2013 | Kim | B60K 7/0007 |
| | | | 310/67 R |
| 2013/0257201 A1* | 10/2013 | Lemke | H02K 5/225 |
| | | | 310/71 |
| 2015/0048713 A1* | 2/2015 | Caamano | H02K 1/148 |
| | | | 310/216.106 |
| 2015/0295455 A1* | 10/2015 | Nemoto | H02K 21/14 |
| | | | 310/216.094 |
| 2016/0056684 A1* | 2/2016 | Nemoto | H02K 21/14 |
| | | | 310/51 |
| 2019/0379312 A1* | 12/2019 | Sakai | H02K 21/14 |
| 2020/0313518 A1 | 10/2020 | Rashkin et al. | |
| 2023/0268784 A1* | 8/2023 | Chen | H02K 1/16 |
| | | | 310/216.001 |

\* cited by examiner

MAGNETIC POWER ELECTRICITY GENERATING SYSTEM

FIELD

The disclosure relates to electrical equipment, and particularly to a magnetic power electricity generating system.

BACKGROUND

As known in the prior art, either the motor or the generator can only operate in a single mode. In other words, the motor can only be used as a power source, and the generator can only be used to supply electrical energy.

In U.S. Pat. No. 4,417,192, a sectional winding for a three phase motor is provided. The sectional winding is divided into two winding sections for each phase, one of which is first connected to the power supply for starting the motor, and when the motor is started, another winding is then connected to the power supply. The object of this invention is to reduce the starting current to prevent thermal overloading. Although the invention discloses an aspect of dividing the winding of the motor into two sections, each winding section is only used to operate in the motor mode. Moreover, such a design has no energy saving effect.

In U.S. Pat. No. 10,122,240, an electricity generation device with low power consumption is disclosed. The device has an operating module, a first motor, and a second motor. In operation, the electricity is inputted to the first motor to actuate the first motor in a short time, the first motor drives a transmission assembly of the operating module to rotate, and the transmission assembly drives a flywheel of the operating module to rotate. A generator rotor is mounted around the flywheel, and a generator stator is mounted around an inner peripheral surface of the body. The second motor is driven by the transmission assembly. When the flywheel reaches a certain rotational speed, the second motor only needs a low current input to keep operating. That is, the second motor can be continuously operated, and the flywheel generates rotor power, thereby achieving power generation at low energy consumption. Such a device has following disadvantages: 1. it must have two motors; 2. It must cooperate with a complex transmission assembly to operate; 3. its generator rotor is mounted in the flywheel, which will increase the electric energy consumed by the second motor; and 4. its generator rotors needs to use permanent magnets, whose magnetic force will decrease with time.

SUMMARY

Therefore, one of the objectives of the disclosure is to provide a magnetic power electricity generating system with both motor and generator operating modes, when more power is required, it is only operated in the motor operating mode, and when being operated simultaneously in motor and generator operating modes, it can be in an energy-efficient manner to supply electrical energy to external loadings.

Another objective of the disclosure is to provide a magnetic power electricity generating system which can apply the output power of flywheels to provide electric energy to external loadings.

Accordingly, according to the disclosure, a magnetic power electricity generating system comprises an electrical machine unit and a control unit. The electrical machine unit comprises a first electrical machine with a first and second operating modes, wherein the first operating mode is that the first electrical machine is operated in a motor operating mode and the second operating mode is that the first electrical machine is operated in a motor operating mode and a generator operating mode simultaneously. The control unit is electrically connected respectively to the electrical machine unit and an external power supply for controlling the first electrical machine to be operated in the first operation mode or in the second operation mode.

The magnetic power electricity generating system disclosed herein may have an aspect that the first electrical machine comprises a stator and a rotor. The stator comprises a stator body and a three-phase stator winding disposed in the stator body. Each phase stator winding of the three-phase stator winding comprises a first coil having a first number of magnetic poles and a first rated output power, and a second coil having a second number of magnetic poles and a second rated output power wherein the first number of magnetic poles is equal to the second number of magnetic poles, the first rated output power is greater than or equal to the second rated output power. The rotor comprises a rotor body with a third number of magnetic poles and a shaft extending along the axis of the rotor body. The rotor body is rotatably disposed in the stator body. The third number of magnetic poles is the same as the first number of magnetic poles and the second number of magnetic poles. Whereby, when the first coil and the second coil are simultaneously electrically connected to an external power supply, the first electrical machine is operated in the first operating mode and when only the second coil electrically connected to the external power supply, the first electrical machine is operated in the second operating mode.

The magnetic power electricity generating system disclosed herein may have a feature that the stator body includes an outer peripheral surface, a through hole, an inner peripheral surface defined by the through hole, and a plurality of first slots spaced apart from each other and extending from the inner peripheral surface to the outer peripheral surface. The first coil and the second coil are respectively installed in the first slots. And the rotor body is rotatably received in the through hole.

The magnetic power electricity generating system disclosed herein may have another feature that the stator body includes an outer peripheral surface, a through hole, an inner peripheral surface defined by the through hole, and a plurality of first slots with a first depth and second slots with a second depth spaced apart from each other and extending from the inner peripheral surface to the outer peripheral surface wherein the first depth is greater than the second depth, the first coil is installed in the first slots, the second coil is installed in the second slots. And the rotor body is rotatably received in the through hole.

The magnetic power electricity generating system disclosed herein may have another aspect that it further comprises a flywheel unit comprising a first flywheel coupled with the first electrical machine such that when the first flywheel is driven by the first operating mode, it will rotate to a predetermined speed to deliver energy to outside, and when the first flywheel is driven to the predetermined speed, the first electrical machine will be in the second operating mode to keep the flywheel driven in the predetermined speed and to supply electric energy to external loadings.

The magnetic power electricity generating system disclosed herein may have another aspect that the electrical machine unit further comprises a second electrical machine having the first and second operating modes and coupled with the first flywheel.

The magnetic power electricity generating system disclosed herein may have another aspect that the flywheel unit further comprises a second flywheel coupled with the first electrical machine.

According to the disclosure, a magnetic power generation system assembly is also disclosed which comprises a plurality of the magnetic power generation systems. Each magnetic energy generating system is connected in a way that the power input of the latter magnetic power generation system is connected to the power output of the previous magnetic power generation system, the power input of the most front magnetic power generation system is connected with an external power supply, and the power output of the last magnetic power generation system is connected with an external loading. Thereby, the electrical energy output of the assembly has a multiplied effect.

BRIEF DESCRIPTION OF THE DRAWINGS

Other features and advantages of the disclosure will become readily apparent to those skilled in the art from the following detailed description of the embodiments in the light of the accompanying drawings, in which.

DETAILED DESCRIPTION

Referring firstly to FIG. 1 to FIG. 5, a first embodiment of the magnetic power electricity generating system according to the disclosure is shown at 10. The magnetic power electricity generating system 10 comprises a first electrical machine 20 and a control unit 40 electrically connected respectively to the first electrical machine 20 and an external power supply 12.

Figure 1:
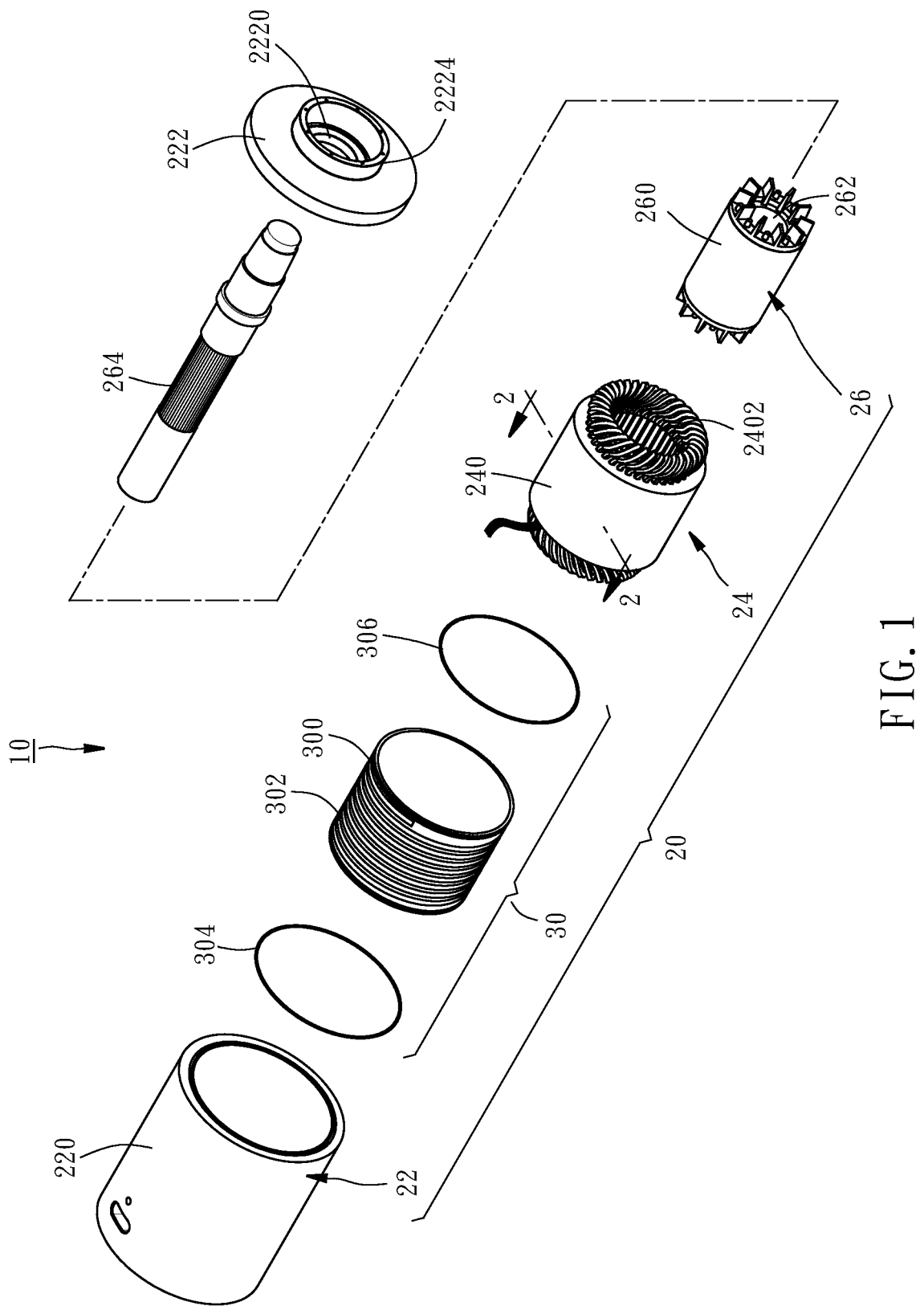
FIG. 1 is an exploded perspective view of a first electrical machine of a first embodiment of the magnetic power electricity generating system according to the disclosure.

The first electrical machine 20, as shown in FIG. 1, comprises a frame 22, a stator 24, a rotor 26 and a cooling means 30. The frame 22 includes a casing 220 and an end cover 222 with a central opening 2220 mounted on one side of the casing 220. The end cover 222 includes a protruding ring 2224 extending outward. The stator 24 is received in the casing 220. The rotor 26 is rotatably disposed within the stator 24.

Figure 2:
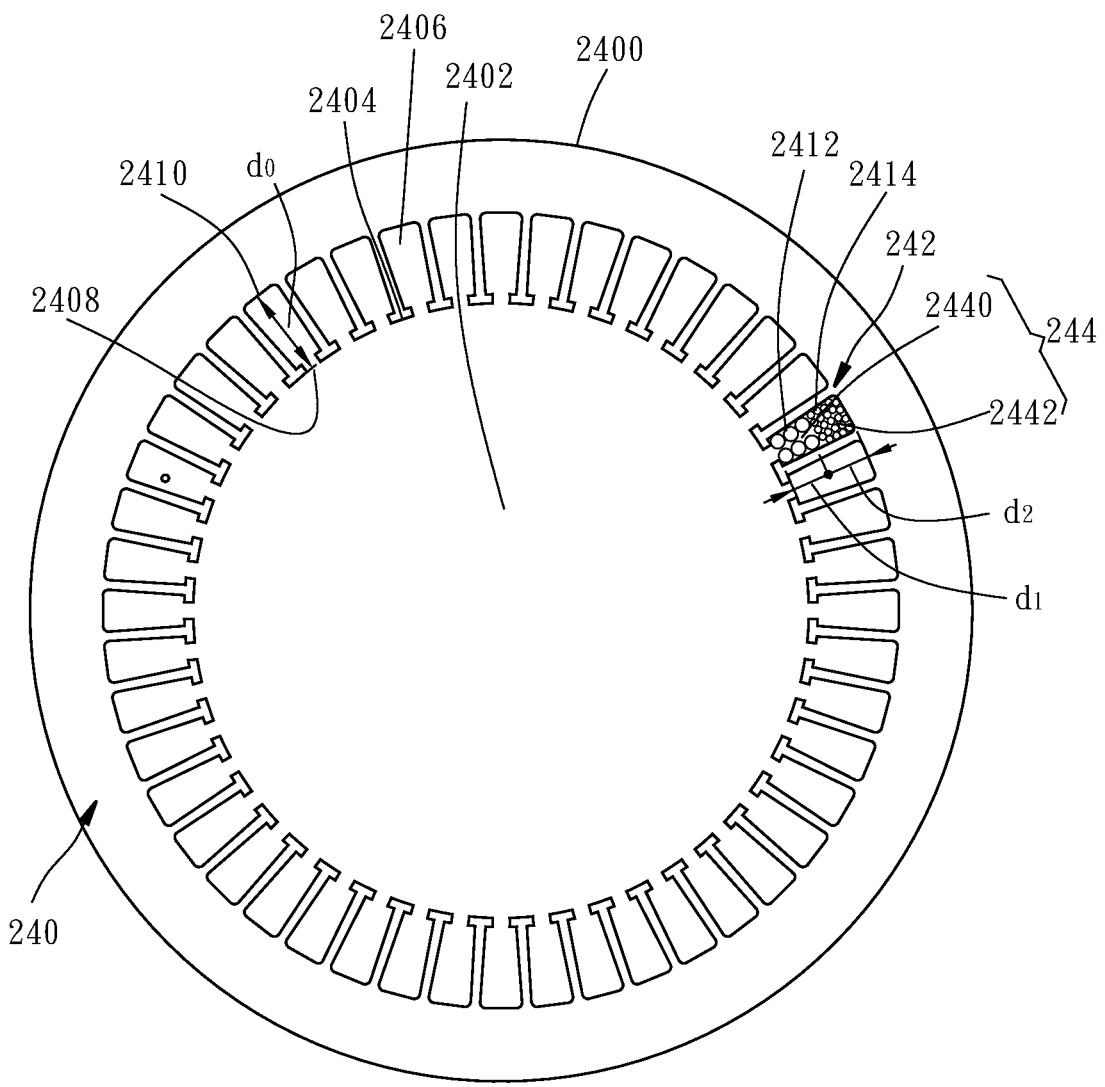
FIG. 2 is a cross-sectional view taken along the direction 2-2 of FIG. 1.

The stator 24, as shown in FIG. 2, comprises a stator body 240 and a stator winding 242 disposed in the stator 240 by a conventional way as known in the art. The stator body 240, in this embodiment, is configured by stacking a plurality of annular silicon-steel sheets. The stator body 240 includes an outer peripheral surface 2400, a through hole 2402, an inner peripheral surface 2404 defined by the through hole 2402, and a plurality of first slots 2406. Each of the first slots 2406 is spaced apart from each other and extends from the inner peripheral surface 2404 to the outer peripheral surface 2400. Each of the first slots 2406 includes an open end 2408 facing the rotor 26, a bottom end 2410 close to the outer peripheral surface 2400. The open end 2408 and the bottom 2410 define the depth de of the first slot 2406. In addition, each of the first slots 2406 has a first portion 2412 adjacent to the open end 2408 and a second portion 2414 adjacent to the bottom 2410. The depth of the first portion 2412 is $d_1$, and the depth of the second portion 2414 is $d_2$, wherein $d_1+d_2=d_0$.

Figure 5:
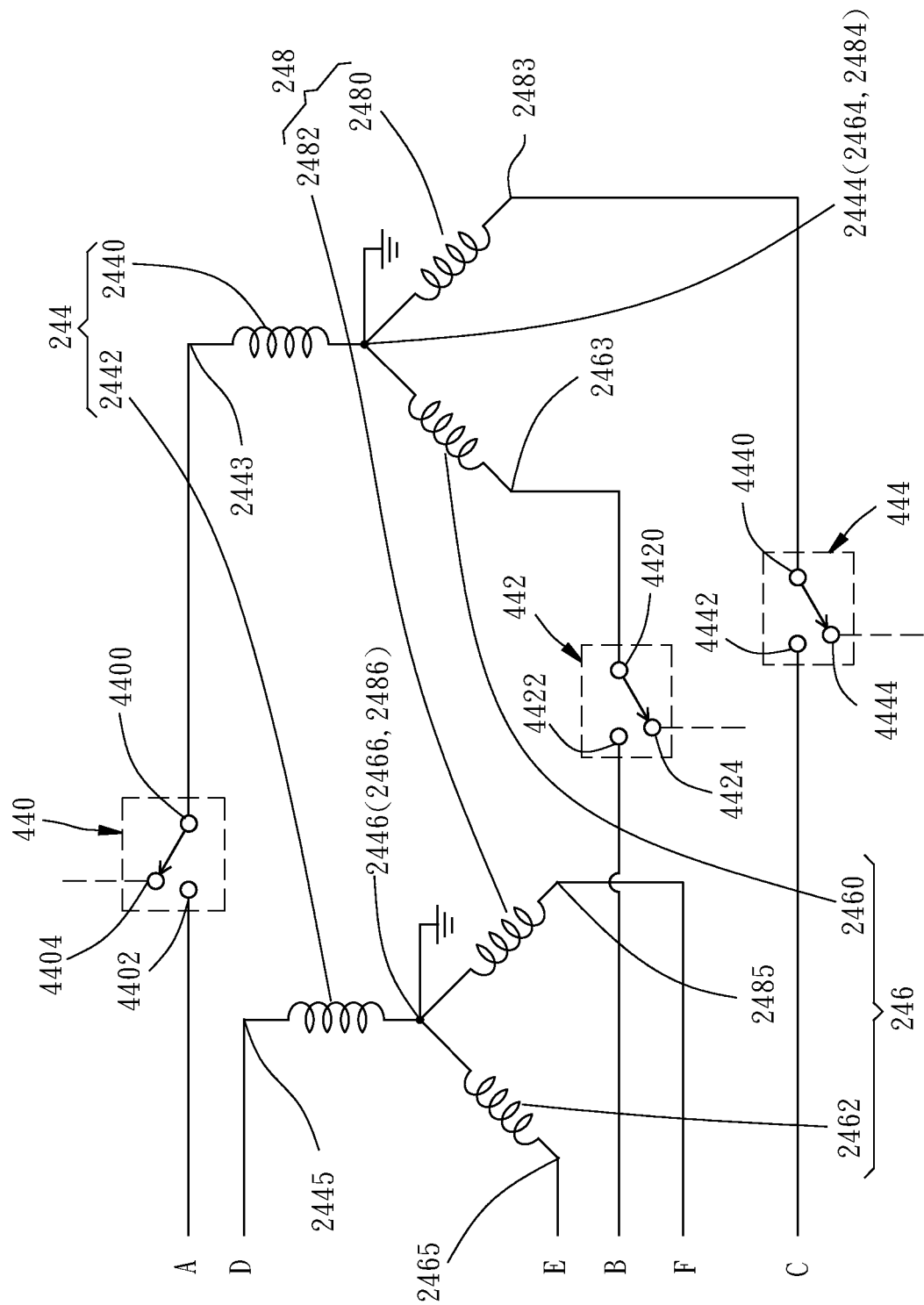
FIG. 5 is a circuit diagram illustrating the electric power connection of the stator winding of the first electrical machine and the control unit of the first embodiment, wherein the stator winding is connected in a Y connection.

The stator winding 242, as shown in FIG. 2 and FIG. 5, is a three-phase winding configured in a Y connection. In more detail, the stator winding 242 comprises an R-phase winding 244, an S-phase winding 246 and a T-phase winding 248. The R-phase winding 244 includes a R-phase first coil 2440 with a R-phase first input end 2443 and a R-phase first output end 2444 and a R-phase second coil 2442 with a R-phase second input end 2445 and a R-phase second output end 2446. The S-phase winding 246 includes an S-phase first coil 2460 with an S-phase first input end 2463 and an S-phase first output end 2464 and an S-phase second coil 2462 with a S-phase second input end 2465 and an S-phase second output end 2466. The T-phase winding 248 includes a T-phase first coil 2480 with a T-phase first input end 2483 and a T-phase first output end 2484 and a T-phase second coil 2482 with a T-phase second input end 2485 and a T-phase second output end 2486. In this embodiment, each of the R, S and T phase first coils 2440, 2460 and 2480 has a first wire diameter of 1.0 mm, a first number of turns of 48, a first number of magnetic poles of 4 and a first rated output power of 7 5HP. Each of the R, S and T phase second coils 2442, 2462 and 24820 has a second wire diameter of 0.8 mm, a second number of turns of 28, a second number of magnetic poles of 4 and a second rated output power of 25 HP. Each of the R, S and T phase first coils 2440, 2460 and 2480 is installed in the first portion 2412 of each of the first slots 2406 and each of the R, S and T phase second coils 2442, 2462 and 2482 is installed in the second portion 2414 of each of the first slots 2406 such that the reluctance of the magnetic circuit passing through the R, S and T phase first coils 2440, 2460 and 2480 can be reduced.

Figure 3:
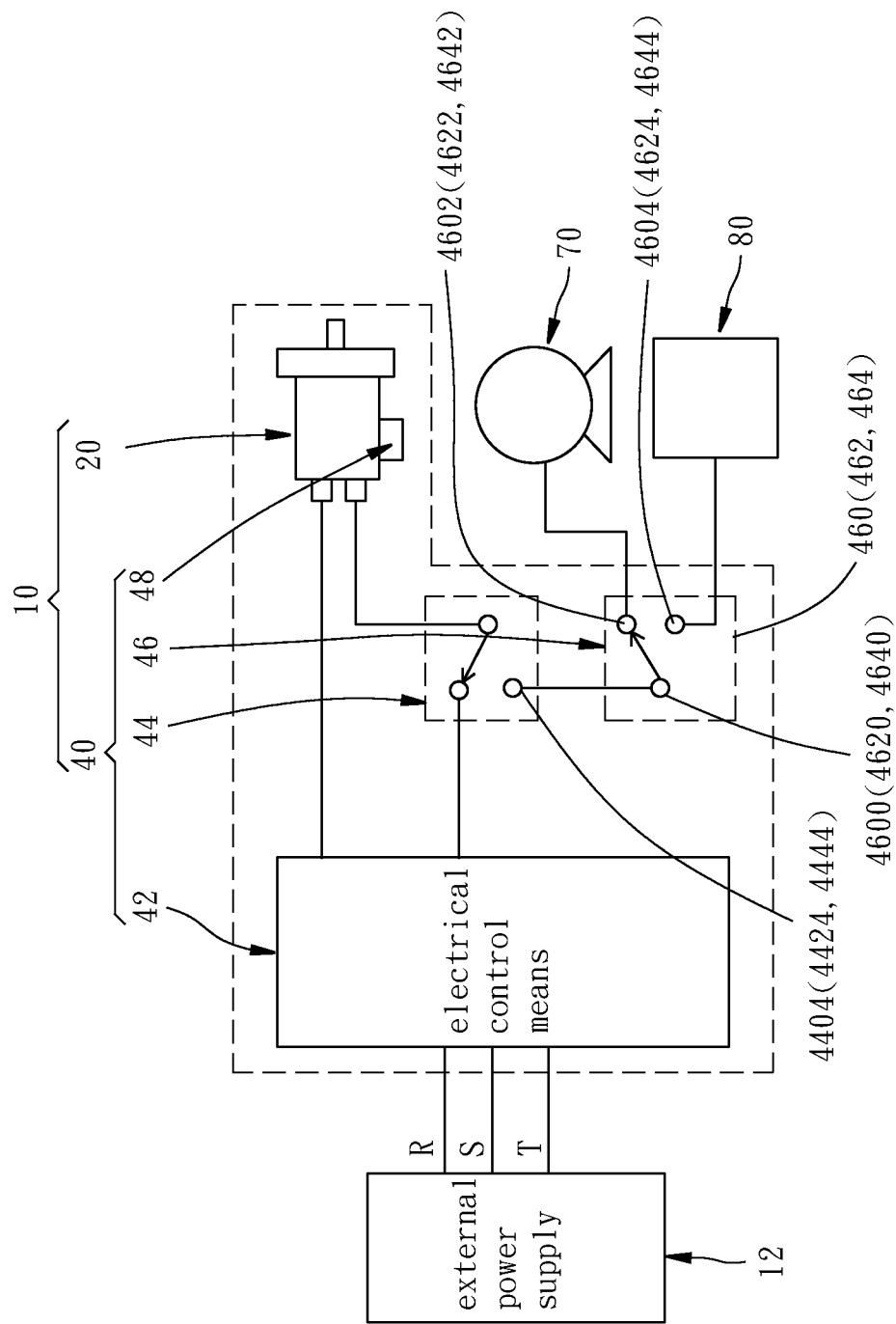
FIG. 3 is a block diagram illustrating the electric power connection of the first embodiment.
Figure 4:
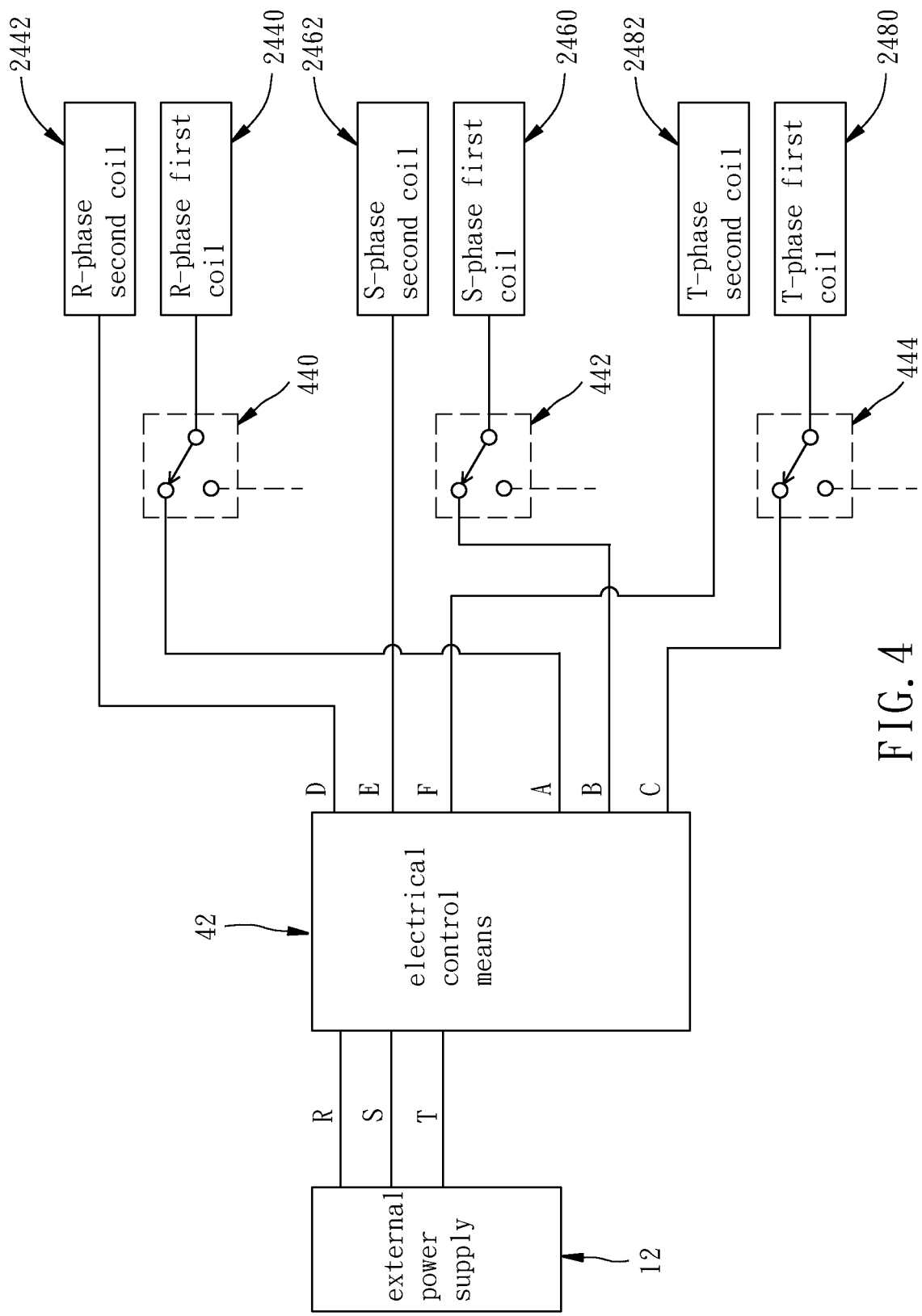
FIG. 4 is a block diagram illustrating the electric power connection of the stator winding of the first electrical machine and the control unit of the first embodiment.

The control unit 40, as shown in FIG. 3-FIG. 5, includes an electrical control means 42 and a three-phase first switch 44, a three-phase second switch 46 and a sensor 48. Of course, the control unit 40 can also be other technical mechanisms, such as servo drives and distributors. The three-phase first switch 44 includes an R-phase first switch 440, an S-phase first switch 442 and a T-phase first switch 444. The R-phase first switch 440 includes a R-phase first contact 4400, a R-phase second contact 4402 and a R-phase third contact 4404. The S-phase first switch 442 includes an S-phase first contact 4420, an S-phase second contact 4422 and an S-phase third contact 4424. The T-phase first switch 444 includes a T-phase first contact 4440, a T-phase second contact 4442 and a T-phase third contact 4444.

In the electrical connection, each of the first inputs 2443, 2463 and 2483 of each of the R, S and T phase first coils 2440, 2460 and 2480 is respectively connected to each of the first contact 4400, 4420, 4440 of each of the R, S and T first switch 440, 442, and 444. Each of the second contact 4402, 4422, 4442 of each of the R, S and T first switch 440, 442, and 444 is respectively connected to the electrical control means 42 via line A, B, and C. Each of the first outputs 2444, 2464 and 2484 of each of the R, S and T phase first coils 2440, 2460 and 2480 is respectively connected to a neutral point. Each of the second inputs 2445, 2465 and 2485 of each of the R, S and T phase second coils 2442, 2462 and 2482 is respectively connected to the electrical control means 42 via line D, F, and F. Each of the second outputs 2446, 2466 and 2486 of each of the R. S and T phase second coils 2440, 2460 and 2480 is respectively connected to the neutral point. The electrical control means 42 is electrically connected to the R-phase output end, the S-phase output end and the T-phase output end of the external power supply 12. In this embodiment, as shown in FIG. 3, the three-phase second switch 46 includes a R-phase second switch 460, an S-phase second switch 462, and a T-phase second switch 464. The R-phase second switch 460 includes a R-phase fourth contact 4600, a R-phase fifth contact 4602 and a R-phase sixth contact 4604. The S-phase second switch 462 includes an S-phase fourth contact 4620, an S-phase fifth contact 4622, and an S-phase sixth contact 4624. The T-phase second switch 464 includes a T-phase fourth contact 4640, a T-phase fifth contact 4642 and a T-phase sixth contact 4644. Each of the fourth contact 4600, 4620 and 4640 of each of the R, S and T phase second switch 460, 462 and 464 is respectively connected to each of the third contact 4404, 4424 and 4444 of each of the R, S and T phase first switch 440, 442 and 444. Each of the fifth contact 4602, 4622 and 4642 of each of the R, S and T phase second switch 460, 462 and 464 is respectively connected to an external motor 70. Each of the sixth contact 4604, 4624 and 4644 of each of the R, S and T phase second switch 460, 462 and 464 is respectively connected to an external energy storage unit 80.

The rotor 26, as shown in FIG. 1, comprises a rotor body 260 with a third number of magnetic poles, an axis hole 262 and a shaft 264 received in the axis hole 262. The rotor body 260 is rotatably disposed in the through hole 2402 of the stator body 240. The third number of magnetic poles is the same as the first number of magnetic poles and the second number of magnetic poles. In addition, the shaft 264 extends outward from the central opening 2220 of the end cover 222.

The cooling means 30, as shown in FIG. 1, is disposed between the casing 220 and the stator body 240 to keep the operating temperature of the first electrical machine 20 under a predetermined temperature. In this embodiment, the cooling means 30 includes a tubular body 300 with a plurality of channels 302 formed on the surface thereof for introducing cooling liquid, such as oil or water or other the like, and two rubber washers 304, 306 respectively disposed at the two side of the tubular body 300 to prevent the cooling liquid seeping out.

Thus, when each of the first contact 4400, 4420, 4440 of each of the R, S and T first switch 440, 442, and 444 is connected to each of the second contact 4402, 4422, 4442 of each of the R, S and T first switch 440, 442, and 444 by the control of the electrical control means 42, the external power supply 12 would simultaneously supply power to each of the first coil 2440, 2460 and 2480 of the R, S and T phase winding 244, 246 and 248, and each of the second coil 2442, 2462 and 2482 of the R, S and T phase winding 244, 246 and 248, at this time, the first electrical machine 20 will be operated in the first operating mode with a power of the sum of the first rated output power 75 HP and the second rated output power 25 HP. And then the sensor 48 will send a signal to the electrical control means 42 to turn each of the first contact 4400, 4420, 4440 of each of the R, S and T first switch 440, 442, and 444 off from each of the second contact 4402, 4422, 4442 of each of the R, S and T first switch 440, 442, and 444 and connect with each of the third contact 4404, 4424 and 4444 of the R, S and T phase first switch 440, 442 and 444 such that the first electrical machine 20 is simultaneously operated in a motor operating mode with the second rated out power 25 HP by the second coil 2442, 2462 and 2482 of the R, S and T phase winding 244, 246 and 248 and in a generator operating mode with the first rated out power 75 HP by the first coil 2440, 2460 and 2480 of the R, S and T phase winding 244, 246 and 248 for providing electric energy to the external motor 70 or the external energy storage unit 80. It must be mentioned here that, in this embodiment, since having the same number of magnetic poles, the first coil 2440, 2460 and 2480 and the second coil 2442, 2462 and 248 will have equal mutual magnetic flux $\Phi_m$ in the stator body 240. Thus, when the input voltage of the power supply 12 is $V_1$, and the output voltage of each of the first coil 2440, 2460 and 2480 is $V_2$, according to the formula of $V_1=N1 d\Phi_m/dt$ and $V_2=N2 d\Phi_m/dt$, the relationship of $N_1/N_2=V_1/V_2$ can be obtained. If the voltage $V_1$ is 220 volts, since the first number of turns $N_1$ is 48 and the second number of turns $N_2$ is 28, the output voltage $V_2$ of each of the first coil 2440, 2460 and 2480 is about 220×48/28=377 volts.

Figure 6:
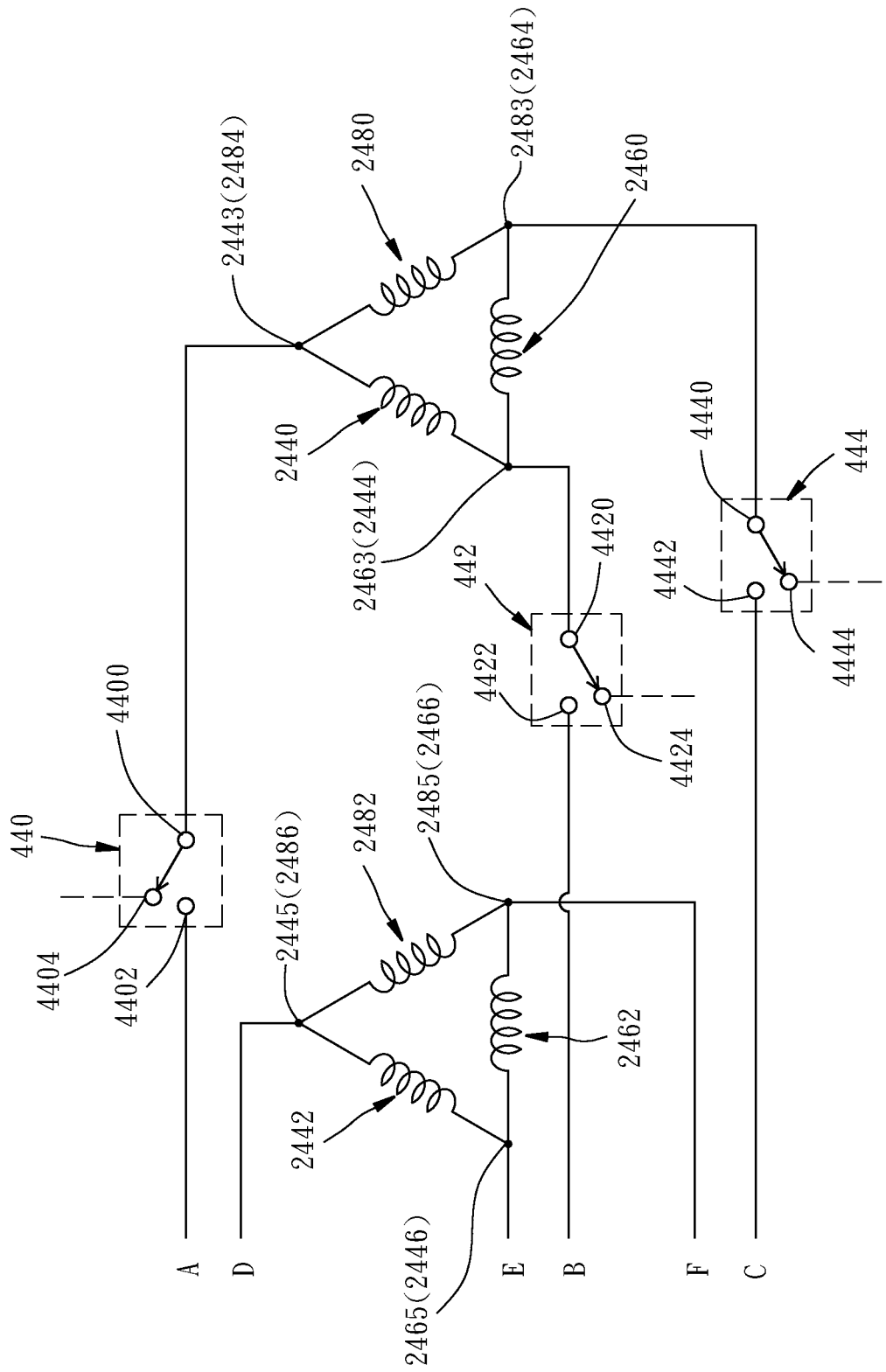
FIG. 6 is a circuit diagram illustrating the electric power connection of the stator winding of the first electrical machine and the control unit of a second embodiment, wherein the stator winding is connected in a delta connection.

Referring to FIG. 6, there shows a second embodiment of the magnetic power electricity generating system according to the disclosure. The difference between the second embodiment and the first embodiment is that the stator winding of the second embodiment is configured in a delta connection. For the convenience of explanation, the reference numbers of the second embodiment below are the same as those of the first embodiment. In the second embodiment, each of the first inputs 2443, 2463 and 2483 of each of the R, S and T phase first coils 2440, 2460 and 2480 is respectively connected to each of the first contact 4400, 4420, 4440 of each of the R, S and T first switch 440, 442, and 444. Each of the second contact 4402, 4422, 4442 of each of the R, S and T first switch 440, 442, and 444 is respectively connected to the electrical control means 42 via line A, B, and C. The first output 2444 of R-phase first coil 2440 is connected to the first input 2463 of the S-phase first coil 2460. The first output 2464 of the S-phase first coil is connected to the first input 2483 of the T-phase first coil 2480. The first output 2484 of the T-phase first coil 2480 is connected to the first input 2443 of the R-phase first coil 2440. Each of the second inputs 2445, 2465 and 2485 of each of the R, S and T phase second coils 2442, 2462 and 2482 is respectively connected to the electrical control means 42 via line D, F, and F. The second output 2446 of R-phase second coil 2442 is connected to the second input 2465 of the S-phase second coil 2462. The second output 2466 of the S-phase second coil is connected to the second input 2485 of the T-phase first coil 2482. The second output 2486 of the T-phase second coil 2482 is connected to the second input 2445 of the R-phase second coil 2442.

Figure 7:
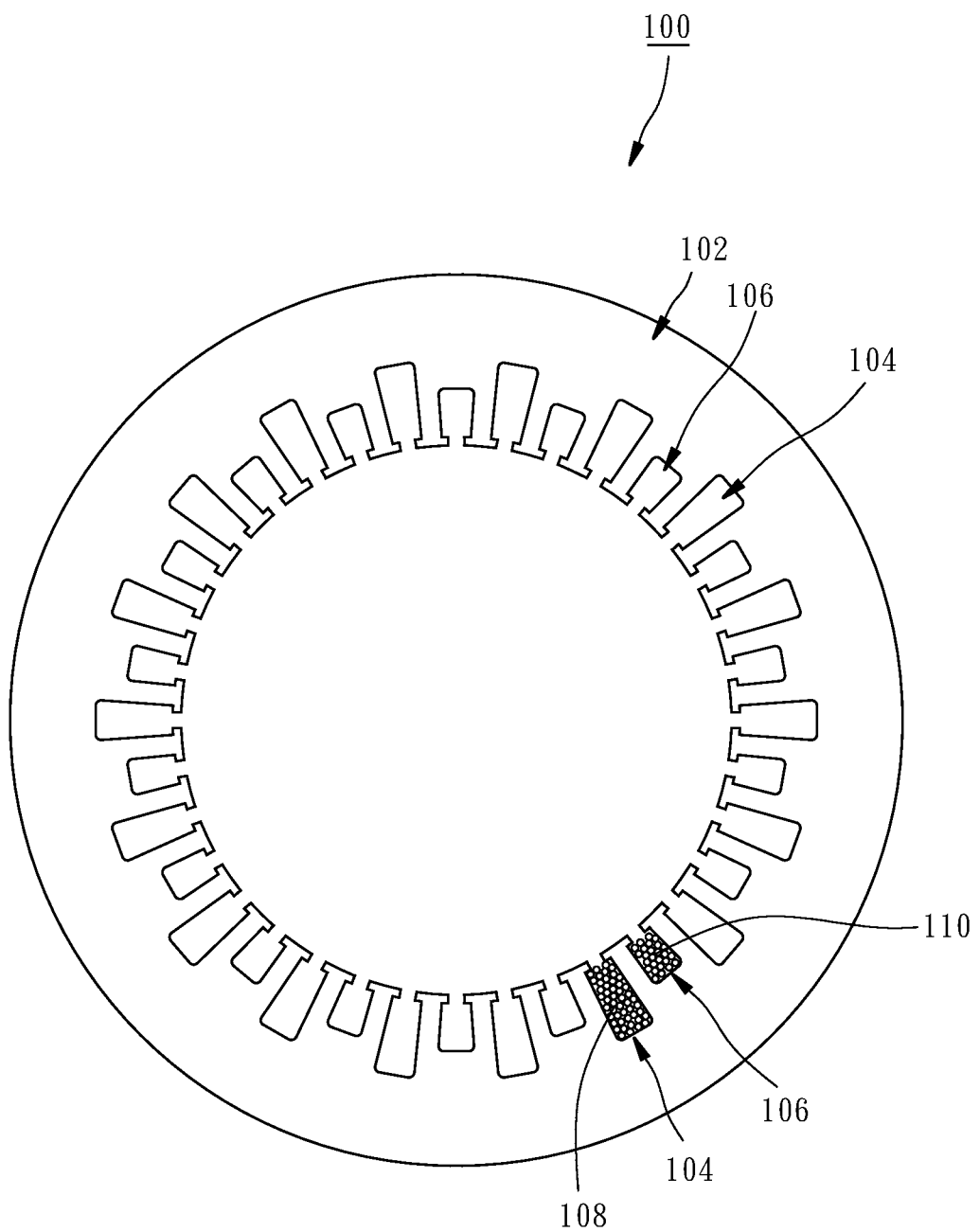
FIG. 7 is a cross-sectional view of a third embodiment of the electricity generating system by magnetic power according to the disclosure in the same direction as FIG. 2.

Referring to FIG. 7, a third embodiment of the magnetic power electricity generating system according to the disclosure is indicated generally at 100. The difference between the magnetic power electricity generating system 100 and the magnetic power electricity generating system 10 is that the magnetic power electricity generating system 100 comprises a stator body 102 including not only a plurality of first slots 104 but also a plurality of second slots 106 wherein the depth of the first slots 104 is greater than that of the second slots 106 and each of the second slots 106 is arranged between two adjacent first slots 104. The first coil 108 of each phase stator winding is installed in the first slots 104 and the second coil 110 of each phase stator winding is installed in the second slots 106. But it must be noted the arrangement herein is just an example.

Figure 8:
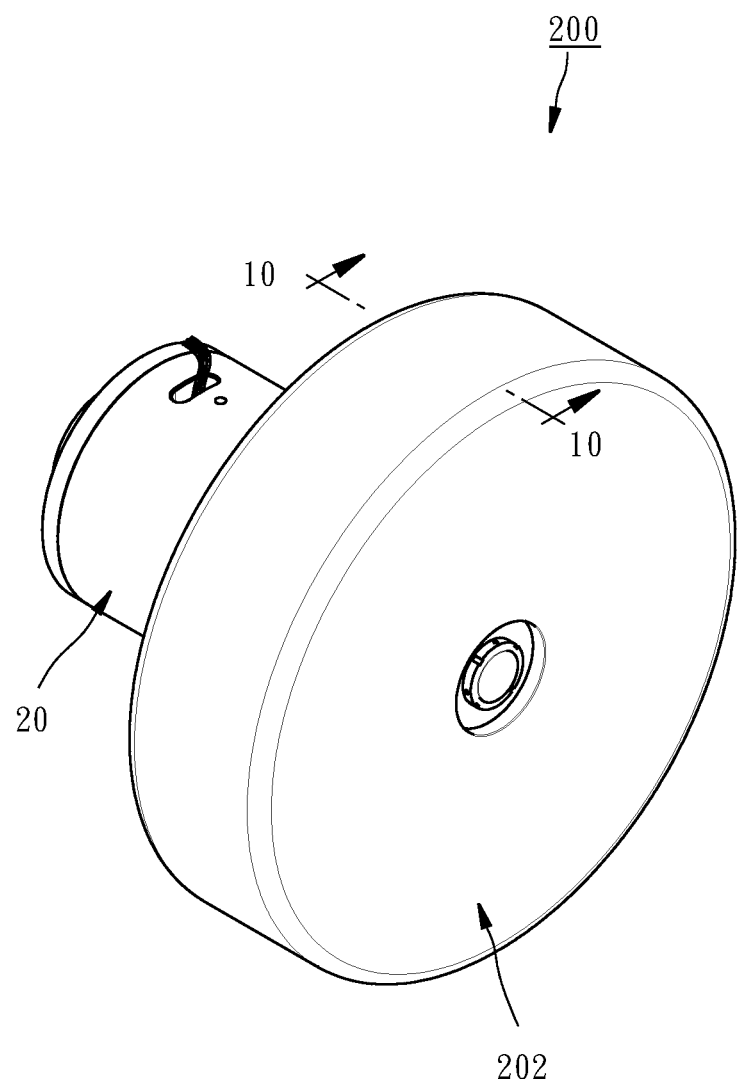
FIG. 8 is a perspective view of the first electrical machine and a first flywheel of a fourth embodiment of the magnetic power electricity generating system according to the disclosure.
Figure 9:
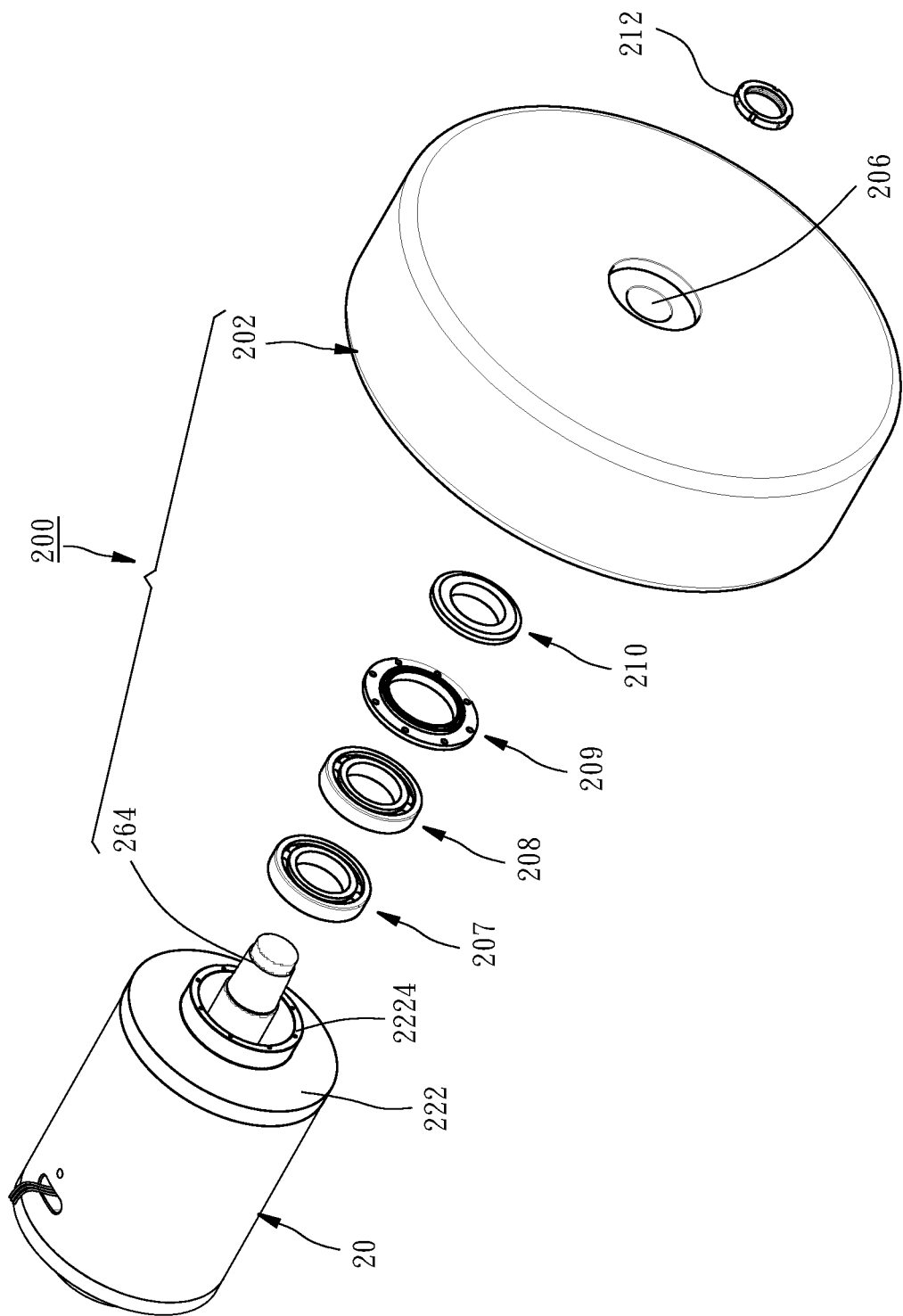
FIG. 9 is an exploded perspective view of the first electrical machine and the first flywheel of the fourth embodiment.
Figure 10:
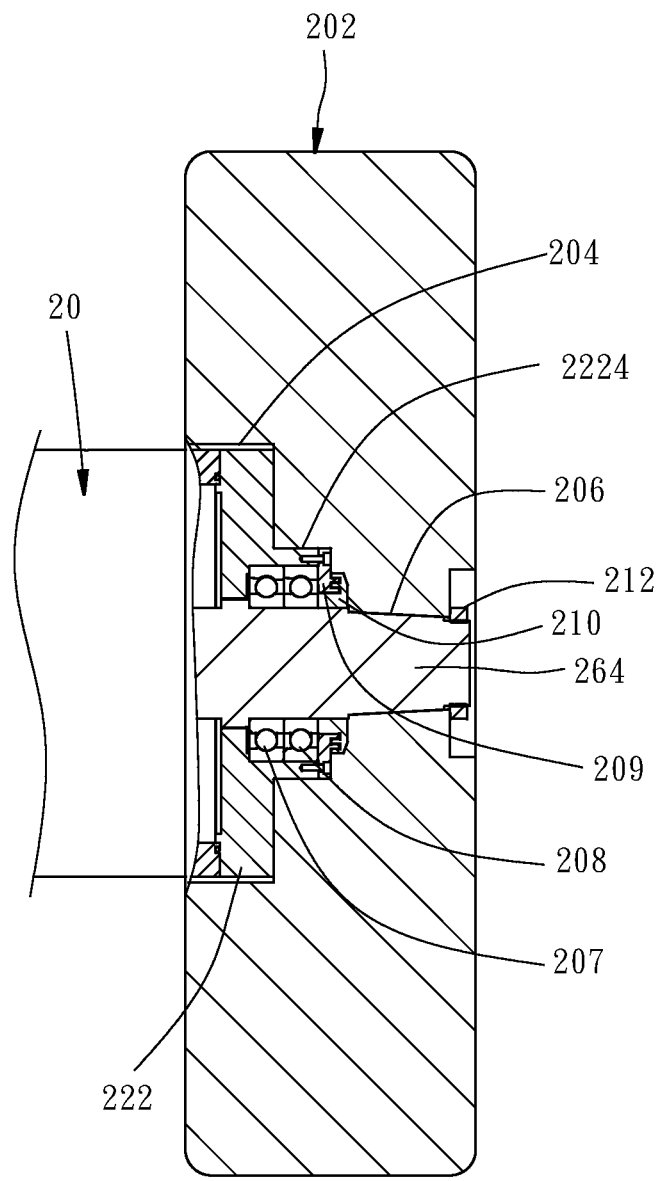
FIG. 10 is a cross-sectional view taken along the direction 10-10 of FIG. 8.

Referring to FIG. 8-FIG. 10, a fourth embodiment of the magnetic power electricity generating system according to the disclosure is indicated generally at 200. The difference between the magnetic power electricity generating system 200 and the magnetic power electricity generating system 10 is that the magnetic power electricity generating system 200 further comprises a first flywheel 202 coupled with the first electrical machine 20. The first flywheel 202 includes a recess 204 disposed on one side of the first flywheel 202 facing the first electrical machine 20 and a second axis hole 206. When the first flywheel 202 is coupled with the first electrical machine 20, the end cover 222 of the frame 22 is received in the recess 204 and the shaft 264 of the rotor 26 passes through the second axis hole 206. In this embodiment, a pair of bearings 207, 208, a pressing plate 209 and an inner plug 210 are disposed between the protruding ring 2224 of the end cover 222 and the shaft 264. And a nut 212 is used to fasten the first flywheel 202 and the shaft 264 together so that the first flywheel 202 will rotate along with the shaft 264. Thus, when the first electrical machine 20 is operated in the first operating mode, the first flywheel 202 will be driven by the first electrical machine 20. As the first flywheel 202 reaches a predetermined speed to deliver energy to outside, the sensor 48 will send a signal to the electrical control means 42 to control the first electrical machine 20 being operated in the second operating mode to keep the first flywheel 202 rotating at the predetermined speed such that the first coil 2440, 2460 and 2480 of the R, S and T phase winding 244, 246 and 248 will be worked as a generator by the energy delivered by the first flywheel 202 for providing electric energy to the external loadings. For example, if the number of magnetic poles of the first electrical machine 20 is 4, the number of turns of the first coil of each phase stator winding is 48, the magnetic flux of each magnetic pole is 0.025 Weber, and the rotational speed of the first flywheel 202 is at 1800 rpm, the frequency of the induced electromotive force of each phase is $f=4\times1800/120=60$ Hz, and the magnitude of the induced electromotive force of each phase is $E=4.44\times48\times60\times0.025=320$ volts.

Figure 11:
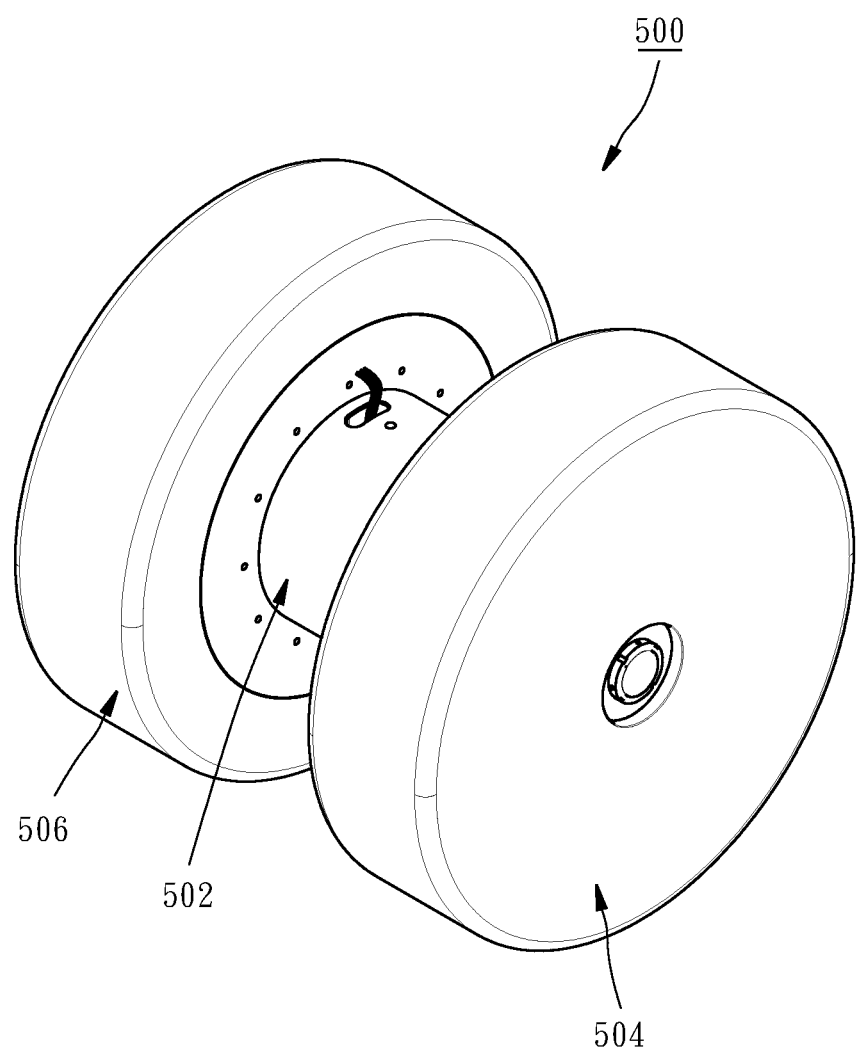
FIG. 11 is a perspective view of a fifth embodiment of the magnetic power electricity generating system according to the disclosure.

Referring to FIG. 11, a fifth embodiment of the magnetic power electricity generating system according to the disclosure is indicated generally at 500. The difference between the magnetic power electricity generating system 500 and the magnetic power electricity generating system 200 is that the magnetic power electricity generating system 500 comprises a second electrical machine 502 being configured the same as the first electrical machine 20, a second flywheel 504 coupled to one side of the second electrical machine 502 and a third flywheel 506 coupled to another side of the second electrical machine 502.

Figure 12:
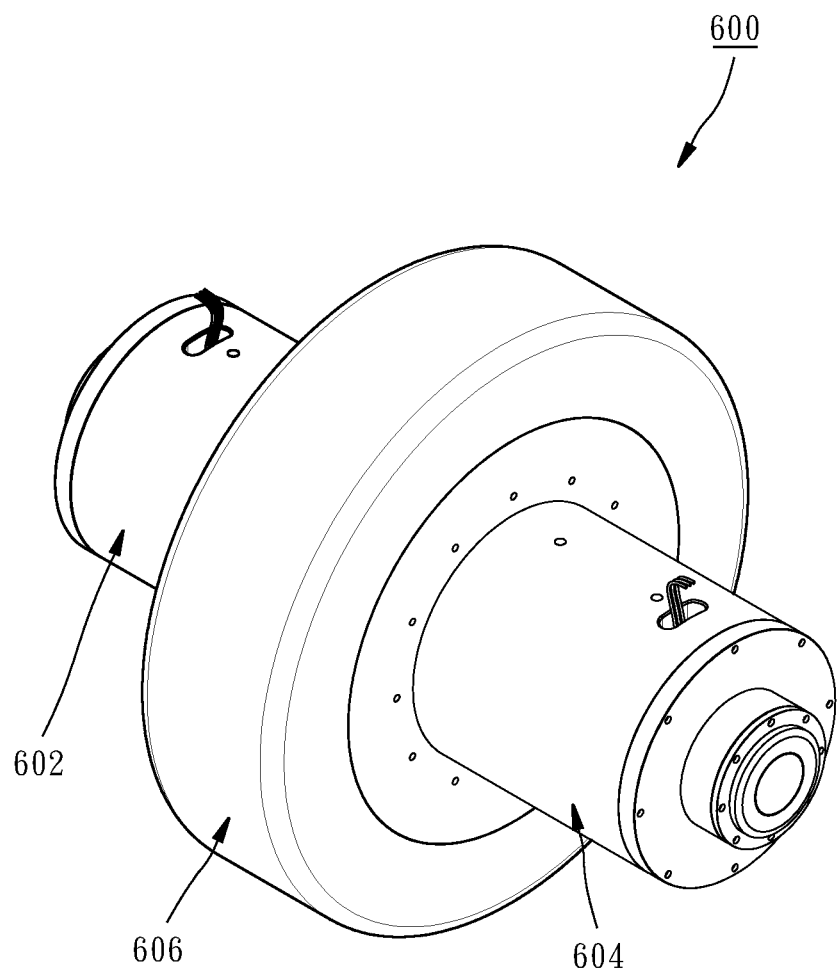
FIG. 12 is a perspective view of a sixth embodiment of the magnetic power electricity generating system according to the disclosure.

Referring to FIG. 12, a sixth embodiment of the magnetic power electricity generating system according to the disclosure is indicated generally at 600. The difference between the magnetic power electricity generating system 600 and the magnetic power electricity generating system 200 is that the magnetic power electricity generating system 600 comprises a third electrical machine 602 being configured the same as the first electrical machine 20, a fourth electrical machine 604 being configured the same as the first electrical machine 20 and a third flywheel 606 respectively coupled to the third and fourth electrical machine 602, 604.

Figure 13:
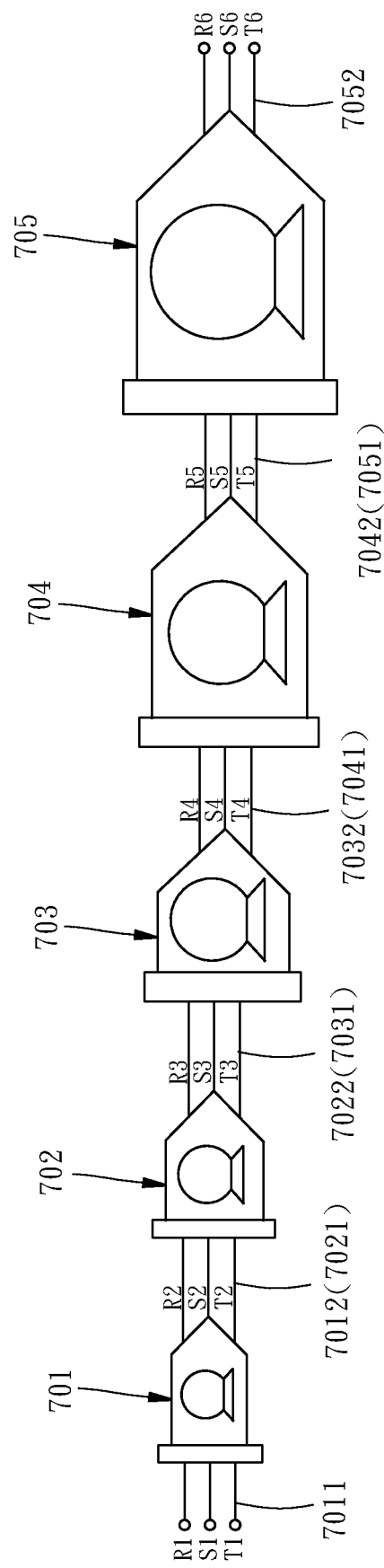
FIG. 13 is a schematic diagram illustrating the electric power connection of a magnetic power generation system assembly according to the disclosure.

Referring lastly to FIG. 13, a magnetic power generation system assembly according to the disclosure is indicated generally at 700. The magnetic power generation system assembly 700 comprises five magnetic power generation systems 701, 702, 703, 704 and 705. Each magnetic energy generating system of the magnetic power generation system assembly 700 is configured the same as the first electrical machine 20. The first magnetic power generation system 701 has a three-phase input end 7011 connected to an external power supply and a three-phase output end 7012. The second magnetic power generation system 702 has a three-phase input end 7021 connected to the three-phase output end 7012 of the first magnetic power generation system 701 and a three-phase output end 7022. The third magnetic power generation system 703 has a three-phase input end 7031 connected to the three-phase output end 7022 of the second magnetic power generation system 702 and a three-phase output end 7032. The fourth magnetic power generation system 704 has a three-phase input end 7041 connected to the three-phase output end 7032 of the third magnetic power generation system 703 and a three-phase output end 7042. The fifth magnetic power generation system 705 has a three-phase input end 7051 connected to the three-phase output end 7042 of the fourth magnetic power generation system 704 and a three-phase output end 7052 connected to an external loading. Thereby, when the electric energy consumed by the first magnetic energy generation system 701 operated in the second operating mode is X, the output electric energy of the first magnetic energy generation system 701 can be 1.2X. When the electric energy consumed by the second magnetic energy generation system 702 operated in the second operating mode is 1.2X, the output electric energy of the second magnetic energy generation system 702 can be 1.44X. When the electric energy consumed by the third magnetic energy generation system 703 operated in the second operating mode is 1.44X, the output electric energy of the third magnetic energy generation system 703 can be 1.73X. When the electric energy consumed by the fourth magnetic energy generation system 704 operated in the second operating mode is 1.73X, the output electric energy of the fourth magnetic energy generation system 704 can be 2.08X. And when the electric energy consumed by the fifth magnetic energy generation system 705 operated in the second operating mode is 2.08X, the output electric energy of the fifth magnetic energy generation system 704 can be 2.50X. In other words, the magnetic power generation system assembly 700 can have an output electric energy being about 2.5 times of the original electric energy consumption.

Although the above-described descriptions are described with reference to the embodiments of the present disclosure, it should be understood that those skilled in the art may be capable of variously modifying and changing the present disclosure within the spirit and the scope disclosed in the claims which will be described below. Further, differences related to modifications and changes should be understood to be included in the scope of the present disclosure defined in the appended claims.

What is claimed is:

1. A magnetic power electricity generating system, comprising:
an electrical machine unit comprising a first electrical machine with a first and second operating modes, wherein the first operating mode is that the first electrical machine is operated in a motor operating mode and the second operating mode is that the first electrical machine is operated in a motor operating mode and a generator operating mode simultaneously; and
a control unit electrically connected respectively to the electrical machine unit and an external power supply for controlling the first electrical machine to be operated in the first operation mode or in the second operation mode;
wherein the first electrical machine comprises a stator comprising a stator body and a three-phase stator winding disposed in the stator body, each phase stator winding of the three-phase stator winding comprising a first coil having a first number of magnetic poles and a first rated output power, and a second coil having a second number of magnetic poles and a second rated output power, the first number of magnetic poles being equal to the second number of magnetic poles, the first rated output power being greater than or equal to the second rated output power; and a rotor comprising a rotor body with a third number of magnetic poles and a shaft extending along the axis of the rotor body, the rotor body rotatably disposed in the stator body, the third number of magnetic poles being the same as the first number of magnetic poles or the second number of magnetic poles; whereby, when the first coil and the second coil are simultaneously electrically connected to an external power supply by the control of the control unit, the first electrical machine is operated in the first operating mode and when only the second coil electrically is connected to the external power supply by the control of the control unit, the first electrical machine is operated in the second operating mode;
wherein the stator body includes an outer peripheral surface, a through hole, an inner peripheral surface defined by the through hole, and a plurality of first slots spaced apart from each other and extending from the inner peripheral surface to the outer peripheral surface; the first coils and the second coils are respectively installed in the first slots; the rotor body is rotatably received in the through hole;
wherein each of the first slots of the stator body includes an open end facing the rotor, a bottom end close to the outer peripheral surface, a first portion adjacent to the open end to install the first coil and a second portion adjacent to the bottom end to install the second coil.

2. The magnetic power electricity generating system of claim 1, wherein each of the first coils includes a first input end and a first output end, each of the second coils includes a second input end and a second output end, the control unit includes an electrical control means and a three-phase first switch, each phase first switch of the three-phase first switch includes a first contact, a second contact and a third contact; the three-phase stator winding is respectively connected in a Y connection, the first input end of the first coil is electrically connected to the first contact of the each phase first switch, and the first output end of the first coil is electrically connected to a neutral point, the second input end of the second coil is electrically connected to the external power supply via the electrical control means, and the second output end of the second coil is connected to the neutral point, the second contact of the each phase first switch is connected to the external power supply via the electrical control means, and the third contact of the each phase first switch is electrically connected to an external loading; whereby, when the magnetic power electricity generating system is in operation, the electrical control means will connect the first contact of the each phase first switch with the second contact of the each phase first switch such that the external power supply will simultaneously supply power to the first coil and the second coil to operate the first electrical machine in the first operating mode and when the first electrical machine is operated in normal state, the electrical control means will disconnect the first contact of the each phase first switch with the second contact of the each phase first switch such that the first electrical machine is operated in the second operating mode to supply electrical to external loadings.

3. The magnetic power electricity generating system of claim 1, wherein each of the first coils includes a first input end and a first output end, each of the second coils includes a second input end and a second output end, the control unit includes an electrical control means and a three-phase first switch, each phase first switch of the three-phase first switch includes a first contact, a second contact and a third contact; the three-phase stator winding is respectively connected in a delta connection wherein each of the first inputs of the first coils is respectively connected to each of the first contacts of each of phase first switches, each of the second contacts of each of phase first switches is respectively connected to the electrical control means, each of the second inputs of each of the second coils is respectively connected to the electrical control means, whereby, when the magnetic power electricity generating system is in operation, the electrical control means will connect the first contact of the each phase first switch with the second contact of the each phase first switch such that the external power supply will simultaneously supply power to the first coil and the second coil to operate the first electrical machine in the first operating mode and when the first electrical machine is operated in normal state, the electrical control means will disconnect the first contact of the each phase first switch with the second contact of the each phase first switch such that the first electrical machine is operated in the second operating mode to supply electrical to external loadings.

4. The magnetic power electricity generating system of claim 2 or 3, wherein the control unit further includes a sensor for outputting a signal to the electrical control means to turn off the power supply of the first coils.

5. The magnetic power electricity generating system of claim 1, comprising a flywheel unit comprising a first flywheel coupled with the shaft of the rotor of the first electrical machine such that when the first flywheel is driven by the first operating mode, it will rotate at a predetermined speed to deliver energy to outside, and when the first flywheel is driven by the second operating mode, it will keep at the predetermined speed and enable the first electrical machine to supply electrical energy to external loadings.

6. The magnetic power electricity generating system of claim 5, wherein the first flywheel includes a recess receiving the end cover and a through hole passed through by the shaft of the rotor.

7. A magnetic power electricity generating system, comprising:
- an electrical machine unit comprising a first electrical machine with a first and second operating modes, wherein the first operating mode is that the first electrical machine is operated in a motor operating mode and the second operating mode is that the first electrical machine is operated in a motor operating mode and a generator operating mode simultaneously; and
- a control unit electrically connected respectively to the electrical machine unit and an external power supply for controlling the first electrical machine to be operated in the first operation mode or in the second operation mode;
- wherein the first electrical machine comprises a stator comprising a stator body and a three-phase stator winding disposed in the stator body, each phase stator winding of the three-phase stator winding comprising a first coil having a first number of magnetic poles and a first rated output power, and a second coil having a second number of magnetic poles and a second rated output power, the first number of magnetic poles being equal to the second number of magnetic poles, the first rated output power being greater than or equal to the second rated output power; and a rotor comprising a rotor body with a third number of magnetic poles and a shaft extending along the axis of the rotor body, the rotor body rotatably disposed in the stator body, the third number of magnetic poles being the same as the first number of magnetic poles or the second number of magnetic poles; whereby, when the first coil and the second coil are simultaneously electrically connected to an external power supply by the control of the control unit, the first electrical machine is operated in the first operating mode and when only the second coil electrically is connected to the external power supply by the control of the control unit, the first electrical machine is operated in the second operating mode; and
- wherein the stator body includes an outer peripheral surface, a through hole, an inner peripheral surface defined by the through hole, and a plurality of first slots with a first depth and second slots with a second depth spaced apart from each other and extending from the inner peripheral surface to the outer peripheral surface, the first depth is greater than the second depth, the first coils are installed in the first slots, the second coils are installed in the second slots; and the rotor body is rotatably received in the through hole.

* * * * *